No. 738,137. PATENTED SEPT. 1, 1903.
J. K. WHITE.
GRAIN AND SEED SEPARATOR.
APPLICATION FILED DEC. 5, 1901.
NO MODEL.
Fig. I.
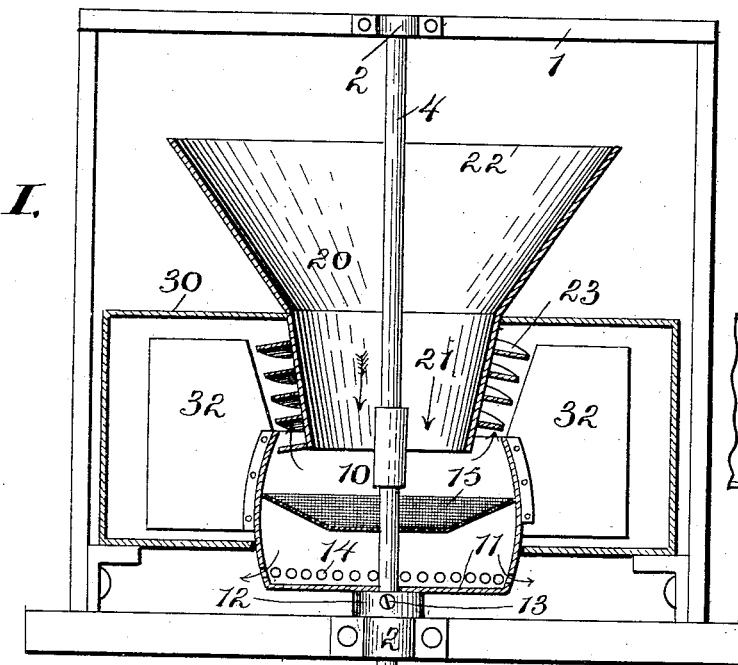
Fig. IV.
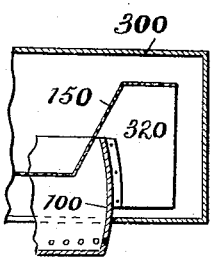
Fig. II.
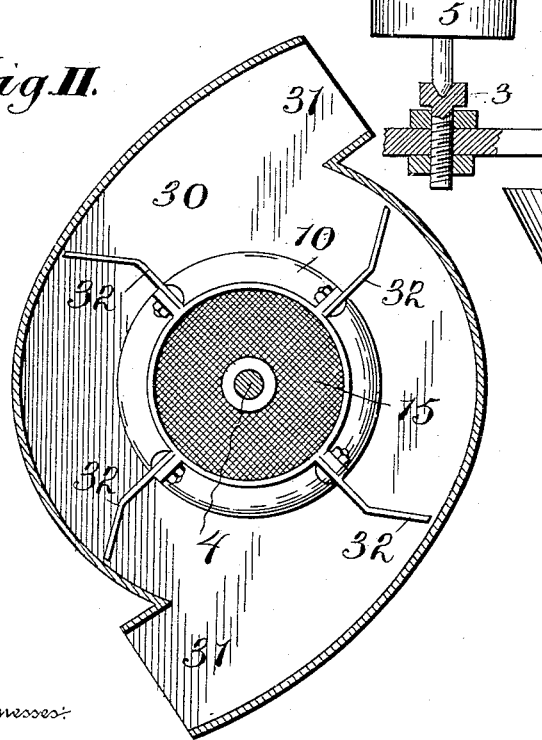
Fig. III.
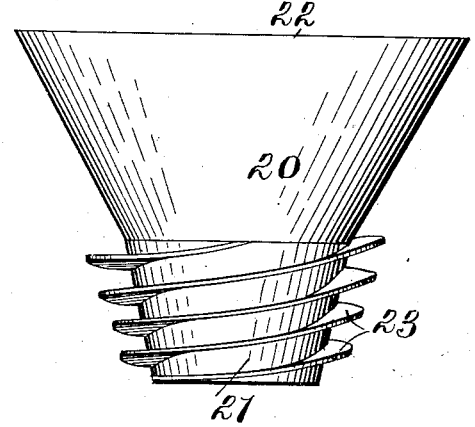
Witnesses:
Geo. E. Truch.
F. R. Fitton.
Inventor:
James K. White,
By Collamer & Co.,
Attorneys.
THE NORRIS PETERS CO., PHOTO-LITHO., WASHINGTON, D. C.

No. 738,137. Patented September 1, 1903.

UNITED STATES PATENT OFFICE.

JAMES K. WHITE, OF MANSFIELD, OHIO.

GRAIN AND SEED SEPARATOR.

SPECIFICATION forming part of Letters Patent No. 738,137, dated September 1, 1903.

Application filed December 5, 1901. Serial No. 84,768. (No model.)

*To all whom it may concern:*

Be it known that I, JAMES K. WHITE, a citizen of the United States, and a resident of Mansfield, Richland county, State of Ohio, have invented certain new and useful Improvements in Grain and Seed Separators; and my preferred manner of carrying out the invention is set forth in the following full, clear, and exact description, terminating with claims particularly specifying the novelty.

The object of the present invention is to separate grain and seed from straw and chaff by centrifugal action, to which end the invention consists in the details of construction hereinafter set forth in the preferred form, whereby certain important results are obtained in an economical manner.

Figure I of the drawings is a central vertical section of this machine complete. Fig. II is a cross-section. Fig. III is a side elevation of the lower end of the hopper. Fig. IV is a sectional detail of a modification.

The numeral 1 designates any suitable framework, having bearings 2 and 3, one of which may be adjustable, as the step 3, wherein is supported an upright shaft 4, driven by power applied to the pulley or gear-wheel 5 in any suitable manner forming no essential part of the present invention.

Surrounding the shaft is a receptacle 10, shaped somewhat like a bowl and preferably having a reduced upper end and a closed bottom 11, resting upon and supported by a collar 12, which is secured to the shaft 4 by a set-screw 13. In the side walls of the bowl and preferably near the bottom are seed-exit openings 14, adapted in size to the grain in connection with which this machine is intended to be used. Within the bowl and extending across the same around the shaft may be a sieve or screen 15, though the use of this device is optional.

20 is the hopper, whose slightly-tapering mouth 21 surrounds the shaft 4 and extends for a slight distance downward into the mouth or upper end of the bowl 10, as best seen in Fig. I and the inlet to this hopper, as designated at 22, may lead direct from the threshing-cylinder or from any other suitable source, this feature not being essential to the present invention. Surrounding the lower end of the hopper is what I might term a "spiral" shelf 23, whose blades stand at about right angles to the hopper-wall and extend outward toward the mouth of the bowl 10, the height of this shelf being such as to lead from a point within the bowl at the lower end of the hopper upward through the mouth of the latter to a point some little distance above. Surrounding the tapering portion of the hopper and the upper portion of the bowl above its seed-openings 14 is a fan-casing 30, which may well be of sheet metal of the desired size and shape and is here shown as having two oppositely-disposed tangential chaff-outlets 31, although there could be a greater or less number of these outlets, and from them might lead a tubular spout or spouts to conduct the straw and chaff to a remote point, though this detail forms no part of the present invention. Secured to the exterior of the bowl are fan leaves or blades 32, extending outward into the fan-casing, as best seen in Fig. II, and properly shaped to give the best results. All parts are of the desired sizes, shapes, porportions, and materials, though preferably of metal, and considerable change in and addition to the details of construction may be made.

In operation power is applied to the wheel 5 to cause the rapid rotation of the bowl, which by means of the blades 32, acting within the casing 30, sets up a blast of air outward through the outlet 31 and creates a certain suction downward through the hopper, as indicated by the arrows in Fig. I. The grain and chaff are then fed in at 22 and pass downward through the mouth 21 of the hopper onto or nearly onto the screen 15, if the latter is employed. As soon as this mixture issues from the mouth of the hopper the blast of air draws the lighter particles, such as chaff, outward and upward and causes them to rise out of the bowl into the casing 30, whence they are ejected through the outlet 31. The rapid rotation of the bowl and its contents also carries these particles of chaff around within the spiral shelf 23, which latter is of such construction that it acts as a chaff-elevator. Meanwhile the heavier particles, such as seed, fall onto and through the screen 15, if it is employed, but in any event finally reaching the bottom 11 of the bowl and are thrown radially outward by centrifugal force until they pass through the exit-openings 14 below the bottom of the casing 30. Thence they fall in a shower and a suitable large-mouthed receptacle may be employed to collect the grain or seed and convey them to the proper point.

In Fig. IV is shown a slight modification wherein the same bowl 100 revolves within a casing 300, which is higher with respect to the height of the blades 320, or the casing may be of the same height and the blade not so high, and the screen 150 is here shown as extending upward beyond the mouth of the bowl and outward over the upper edges of the blades 320.

While many changes in details may be made, as above intimated, this modification which occurs to me now may produce considerable change in results, because chaff and straw passing outward over the screen may carry with it some grain, which being heavier would fall through the screen into the bottom of the casing and not be blown away.

What I claim as new is—

1. In a grain-separator, a rotating receptacle having a closed bottom and upright annular side walls rising from the periphery of said bottom, curving outwardly to about the center of the receptacle, thence curving inwardly to the top of the receptacle, and thus forming a reduced and open upper end, the side walls having exit-openings near said bottom only; combined with a stationary hopper for feeding grain and chaff into said upper end of the receptacle, and means to separate the seeds from the chaff therein.

2. In a grain-separator, an upright rotating shaft, a collar thereon, and a bowl-shaped receptacle mounted on the shaft above the collar and rotated thereby, the receptacle having a closed bottom and seed-exit openings in its side walls; combined with a hopper having a tapering mouth smaller than the upper end of the bowl into which it projects, said hopper being fixedly supported and apapted to deliver grain and straw and chaff, and means for separating the seeds from the chaff.

3. In a grain-separator, an upright rotating shaft, and a bowl-shaped receptacle mounted on the shaft and rotated thereby, the receptacle having a bottom and seed-exit openings; combined with a screen supported within the bowl above its bottom, a hopper fixedly supported and adapted to deliver grain, straw, and chaff, and means for separating the seeds from the chaff and straw.

4. In a grain-separator, an upright rotating shaft, and a bowl-shaped receptacle adjustable vertically on the shaft and rotated thereby, the receptacle having a bottom and seed-exit openings; combined with a hopper having a tapering mouth smaller than the upper end of the bowl into which it projects, a spiral shelf surrounding said mouth at and within the upper end of the bowl, said hopper being fixedly supported and adapted to deliver grain, straw and chaff, and means for separating the seeds from the chaff and straw.

5. In a grain-separator, a bowl-shaped receptacle rotating on an upright axis and having a flat closed bottom with seed-exit openings in its side walls near said bottom, and fan-blades secured to the exterior of said receptacle; combined with a hopper having a tapering mouth delivering into the upper end of said receptacle, a spiral shelf surrounding said mouth, and a fan-casing surrounding the bowl and blades and having a chaff-outlet.

6. In a grain-separator, a receptacle rotating on an upright axis and having closed and curved side walls and a flat closed bottom with seed-exit openings in its side walls near said bottom only, and fan-blades secured to the exterior of said receptacle above said openings; combined with a non-rotary hopper having a tapering mouth delivering into the upper end of said receptacle, a fan-casing surrounding the upper part of bowl and inclosing its blades but not its seed-openings, and a chaff and straw outlet in the casing.

7. In a grain-separator, a bowl-shaped receptacle rotating on an upright axis and having a bottom and seed-exit openings, and fan-blades secured to the exterior of said receptacle; combined with a hopper having a tapering mouth delivering into the upper end of said receptacle, a spiral shelf surrounding said mouth, and a fan-casing surrounding the bowl and blades and having a chaff and straw outlet.

8. In a grain-separator, an upright rotating shaft, a hopper surrounding said shaft and having a tapering mouth, and a casing surrounding the hopper and shaft and having outlets for chaff and straw; combined with a bowl-shaped receptacle mounted on and rotated by the shaft with its upper end surrounding the lower end of said hopper, grain-exits near the lower end of said bowl, fan-blades secured to said bowl and rotating within the casing, and a screen supported within and across the bowl and extending thence upward over the inner and outward along the upper edges of said blades, as and for the purpose set forth.

In testimony whereof I have hereunto subscribed my signature this the 15th day of November, A. D. 1901.

JAMES K. WHITE.

Witnesses:
E. W. GANS,
GEO. W. PYLE.